(12) United States Patent  (10) Patent No.: US 11,467,261 B2
Koyama et al.  (45) Date of Patent: Oct. 11, 2022

(54) DISTANCE MEASURING DEVICE AND MOVING OBJECT

(71) Applicant: PANASONIC INTELLECTUAL PROPERTY MANAGEMENT CO., LTD., Osaka (JP)

(72) Inventors: Shinzo Koyama, Osaka (JP); Akihiro Odagawa, Osaka (JP); Takuma Katayama, Kyoto (JP); Tsuyoshi Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 574 days.

(21) Appl. No.: 16/603,142

(22) PCT Filed: Apr. 21, 2017

(86) PCT No.: PCT/JP2017/015996
§ 371 (c)(1),
(2) Date: Oct. 4, 2019

(87) PCT Pub. No.: WO2018/193609
PCT Pub. Date: Oct. 25, 2018

(65) Prior Publication Data
US 2020/0033451 A1  Jan. 30, 2020

(51) Int. Cl.
*G01S 17/10* (2020.01)
*G01S 7/481* (2006.01)
(Continued)

(52) U.S. Cl.
CPC .......... *G01S 7/4814* (2013.01); *G01S 7/4815* (2013.01); *G01S 7/4861* (2013.01); *G01S 17/10* (2013.01); *G01S 17/89* (2013.01)

(58) Field of Classification Search
CPC .... G01S 7/4814; G01S 7/4815; G01S 7/4861; G01S 17/10; G01S 17/89
(Continued)

(56) References Cited

U.S. PATENT DOCUMENTS 5,368,392 A * 11/1994 Hollander ................. G01J 5/07
356/49
7,969,558 B2  6/2011 Hall
(Continued)

FOREIGN PATENT DOCUMENTS

JP  2001-337166 A  12/2001
JP  2013-072878 A  4/2013
(Continued)

OTHER PUBLICATIONS

Extended European Search Report issued in corresponding European Patent Application No. 17906394.6, dated Feb. 21, 2020.
(Continued)

*Primary Examiner* — Nguyen T Truong
(74) *Attorney, Agent, or Firm* — McDermott Will & Emery LLP

(57) ABSTRACT

A distance measuring device that measures a distance to an object. The distance measuring device includes: a light source that emits pulsed light; a reflector that reflects and radiates, as radiation light, the pulsed light emitted from the light source, and reflects object light that is the radiation light reflected by the object and returning; and an imager that captures the object light reflected by the reflector. The pulsed light emitted from the light source is diffused light. The light source and the imager are located to face the reflector. The reflector radiates, as the radiation light, light in a shape with a long axis and a short axis. The imager performs exposure in synchronization with the pulsed light to image the object light.

13 Claims, 13 Drawing Sheets

(51) Int. Cl.
*G01S 7/4861* (2020.01)
*G01S 17/89* (2020.01)

(58) Field of Classification Search
USPC .................................................. 356/5.01
See application file for complete search history.

(56) References Cited

U.S. PATENT DOCUMENTS

| | | |
|---|---|---|
| 2001/0015751 A1 | 8/2001 | Geng |
| 2001/0046317 A1* | 11/2001 | Kamon .................. G06T 7/521 |
| | | 382/154 |
| 2013/0076893 A1 | 3/2013 | Jeong et al. |
| 2013/0121004 A1* | 5/2013 | Xi ...................... G02B 19/0061 |
| | | 359/641 |

FOREIGN PATENT DOCUMENTS

| | | |
|---|---|---|
| JP | 2014-160777 A | 9/2014 |
| JP | 2016-219258 A | 12/2016 |

OTHER PUBLICATIONS

International Search Report and Written Opinion dated Jul. 25, 2017, in International Application No. PCT/JP2017/015996; with partial English translation.

\* cited by examiner

DISTANCE MEASURING DEVICE AND MOVING OBJECT

CROSS-REFERENCE OF RELATED APPLICATIONS

This application is the U.S. National Phase under 35 U.S.C. § 371 of International Patent Application No. PCT/JP2017/015996, filed on Apr. 21, 2017, the entire disclosure of which Application is incorporated by reference herein.

TECHNICAL FIELD

The present disclosure relates to a distance measuring device and a moving object including the distance measuring device.

BACKGROUND ART

As a distance measuring device capable of measuring a distance to an object, a device employing a ranging technique called "LIDAR" is known (see, e.g., Patent Literature (PTL) 1). This type of distance measuring device measures a distance to an object using light, and includes, for example, a light-emitting element and an image sensor. The light-emitting element emits a laser beam. The image sensor images the reflected light obtained by reflecting the laser beam emitted from the light-emitting element using the object.

CITATION LIST

Patent Literature

PTL 1: U.S. Pat. No. 7,969,558
PTL 2: Japanese Unexamined Patent Application Publication No. 2016-219258

SUMMARY OF THE INVENTION

Technical Problems

In a distance measuring device, an increase in the measuring range capable of measuring a distance is desired for as far as possible detection of an object present at a long distance. Specifically, increases in the range of the angle that can be measured (i.e., a measurable angle) around the distance measuring device and in the distance that can be measured (i.e., measurable distance) from the distance measuring device are desired in the distance measuring device.

In this case, it is conceivable to increase the measurable angle by increasing the angle of view of the image sensor. However, if only the angle of view of the image sensor increases, the density of light of the optical element decreases at a long distance. That is, the distance that the light of the optical element can travels decreases. This result in a decrease in the measurable distance, allowing for measurement of the distance only to an object present at a short distance.

To address the problem, it is conceivable to increase the measurable angle and the measurable distance by increasing the numbers of light-emitting elements and image sensors. Such an increase in the numbers of light-emitting elements and image sensors increases the number of components of, for example, the mechanical mechanism. This results in an increase in the overall size of the distance measuring device.

In this manner, an increase in the measuring range is desired in a distance measuring device, without largely increasing the numbers of light-emitting elements and image sensors and the overall size of the device.

PTL 2 discloses a technique capable of radiating light in a wide range to detect surrounding objects at a great viewing angle. PTL 2 describes using a conical radiation member to reflect and circumferentially eradiate the visible light emitted from a light-emitting device.

In this case, an increase in the measurable angle and miniaturization of the device are expected using the radiation member disclosed in PTL 2 for a distance measuring device.

However, if light is radiated uniformly in a certain direction, a distance measuring device with such a configuration obtains the distance from the distance measuring device to an object isotropically. That is, the measurable distance is constant at a certain measurement angle.

If the distance measuring device is placed in a moving object, such as a vehicle, moving at a high speed, measurement of the distance to an object present at a long distance is desired in the moving direction of the moving object. However, if the light is uniformly radiated in a certain direction as described above the horizontal (i.e., lateral) measurable distance of the moving object increases with an increase in the measurable distance of the moving direction of the moving object. That is, the detectable measurement distance in the lateral direction requiring no long measurable distance is the same as that in the moving direction requiring an as long as possible measurable distance to detect an object present at a long distance. This may unnecessarily increase the overall size of the distance measuring device. Conversely, a decrease in the measurable distance in the lateral direction of the moving object, which does not require much detection of an object, needs a smaller number of components to reduce the overall size of the distance measuring device. However, this also reduces the measurable distance in the moving direction of the moving object, which requires as far as possible detection of an object, thereby hindering detection of the object present at a long distance in the moving direction of the moving object.

The present disclosure was made to solve such problems. It is an objective of the present disclosure to provide a miniaturized distance measuring device with an increased measurable angle, while easily increasing the measurable distance in the direction requiring as far as possible detection of an object, as compared to the measurable distance in the direction not requiring much detection of an object; and a moving object.

Solutions to Problems

In order to achieve the objective, a distance measuring device according to one aspect of the present disclosure measures a distance to an object. The distance measuring device includes: a light source that emits pulsed light; a reflector that reflects and radiates, as radiation light, the pulsed light emitted from the light source, and reflects object light that is the radiation light reflected by the object and returning; and an imager that captures the object light reflected by the reflector. The pulsed light emitted from the light source is diffused light. The light source and the imager are located to face the reflector. The reflector radiates, as the radiation light, light in a shape with a long axis and a short axis. The imager performs exposure in synchronization with the pulsed light to capture the object light.

A moving object according to one aspect of the present disclosure, the distance measuring device is disposed with the long axis extending in a moving direction of the moving object.

Advantageous Effects of Invention

The present disclosure provides a miniaturized device with an increased measurable angle, while easily increasing the measurable distance in the direction requiring as far as possible detection of an object, as compared to the measurable distance in the direction not requiring much detection of an object.

DESCRIPTION OF EXEMPLARY EMBODIMENTS

Embodiments of the present disclosure will be described with reference to the drawings. Note that the embodiments described below are mere preferred specific examples of the present disclosure. Thus, the numerical values, shapes, materials, constituent elements, the arrangement and connection of the constituent elements etc. shown in the following embodiments are mere examples, and are not intended to limit the scope of the present disclosure. Among the constituent elements in the following embodiments, those not recited in any of the independent claims defining the broadest concept of the present disclosure are described as optional constituent elements.

The figures are schematic diagrams not necessarily shown exactly. In the figures, the same reference marks are used to represent equivalent elements, and redundant explanation may be omitted or simplified.

In the specification and the drawings, X-axis, Y-axis and Z-axis are three axes of a three-dimensional orthogonal coordinate system. In this embodiment, the Z-axis extends vertically and is perpendicular to the horizontal direction (i.e., parallel to the XY plane). The X- and Y-axes are orthogonal to each other and to the Z-axis.

Embodiment 1

Figure 1:
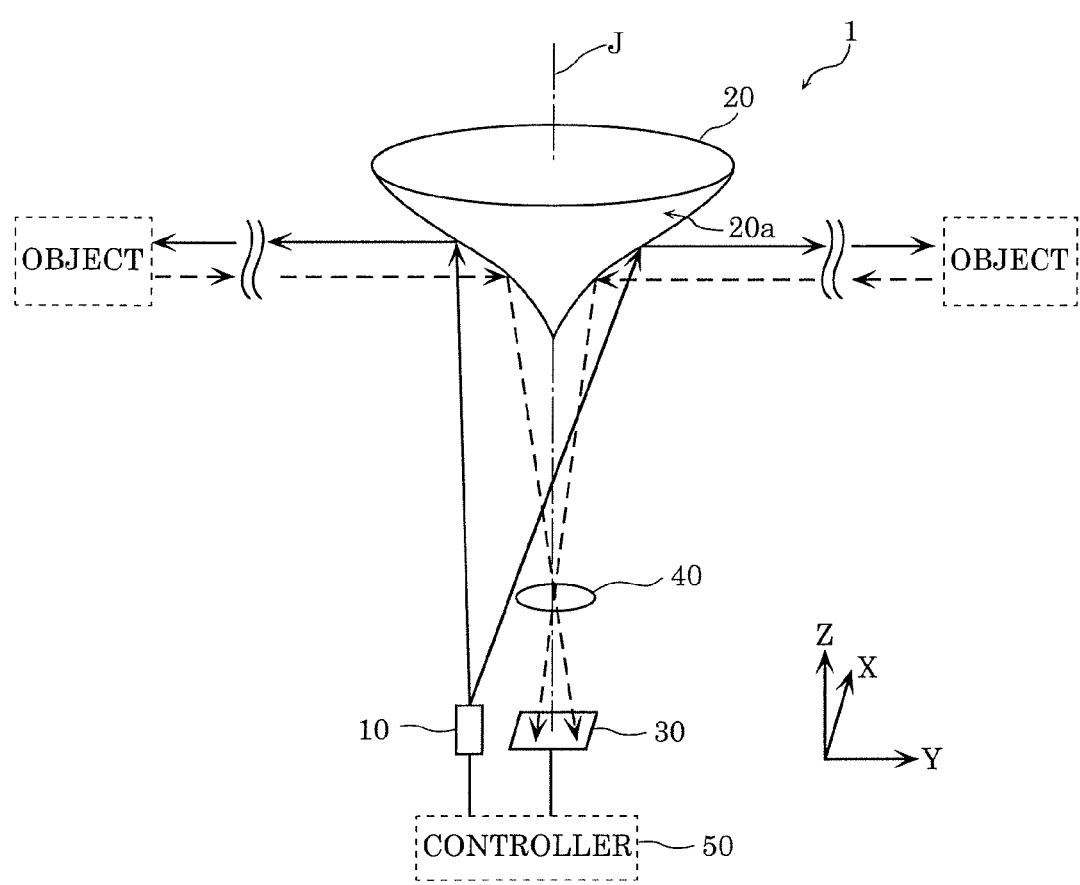
FIG. 1 illustrates a schematic configuration of a distance measuring device according to Embodiment 1.
Figure 2:
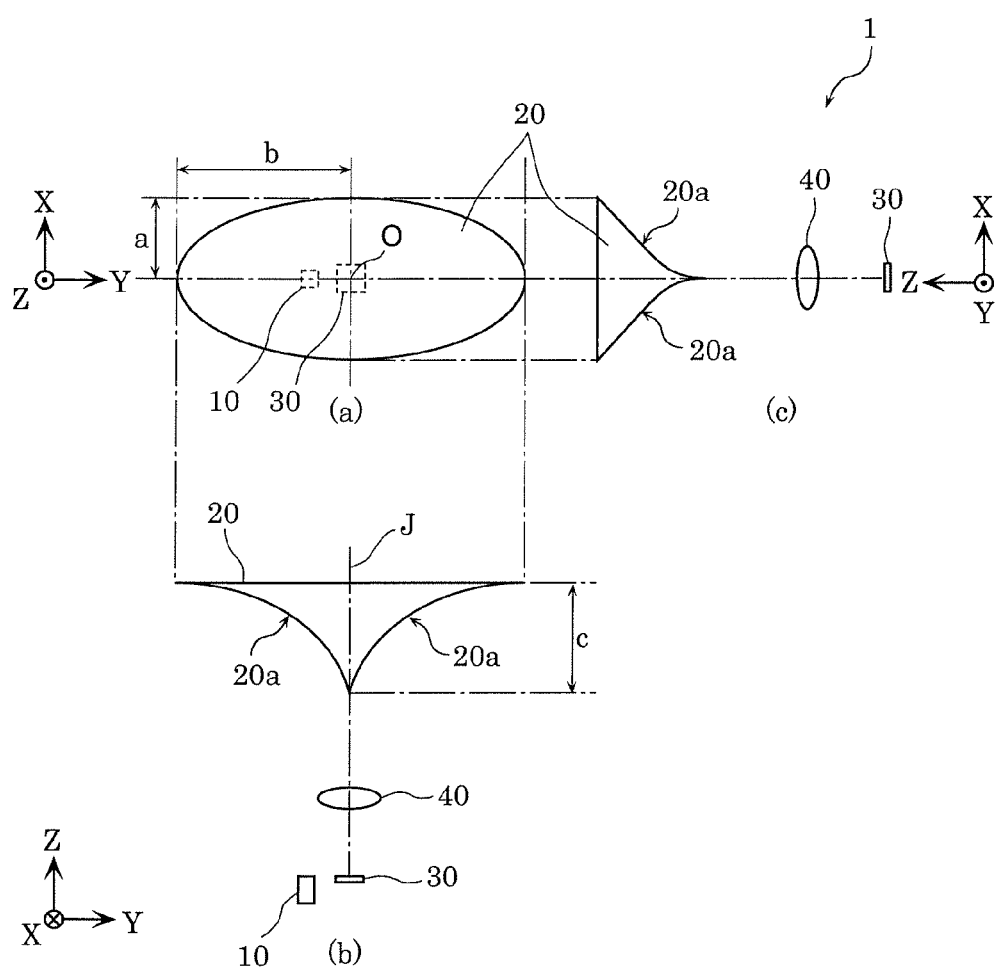
FIG. 2 illustrates another schematic configuration of the distance measuring device according to Embodiment 1.

First, distance measuring device 1 according to Embodiment 1 will be described with reference to FIGS. 1 and 2. FIGS. 1 and 2 illustrate a schematic configuration of distance measuring device 1 according to Embodiment 1. In FIG. 1, solid arrows represent the locus of the light emitted from light source 10, while broken arrows represent the locus of the light emitted from light source 10, reflected by an object, and returning. In FIG. 2, (a) is a plan view, (b) is a front view, and (c) is a side view.

As shown in FIGS. 1 and 2, distance measuring device 1 measures a distance to an object to be measured (i.e., a measurement target), and includes light source 10, reflector 20, and imager 30. In this embodiment, distance measuring device 1 further includes lens 40 and controller 50. The object to be measured is a subject present around distance measuring device 1.

Light source 10 emits light pulsed on a time axis. Specifically, light source 10 emits pulsed light (with a square wave) in a rectangular shape. In this embodiment, light source 10 is a light-emitting element itself, and a laser element that emits, for example, a laser beam. That is, light source 10, which is a laser element, emits a pulsed laser beam. While light source 10 emits near-infrared rays (near-infrared light), the light is however not limited thereto. In this embodiment, light source 10 is a single laser element.

The light emitted by light source 10 is the light diffused at a predetermined diffusion angle. In this embodiment, the diffused light emitted by light source 10 enters reflector 20 at a diffusion angle including the vertex of conical reflector 20. In this case, the diffusion angle of the diffused light emitted by light source 10 is preferably, for example, 3 degrees or greater, and more preferably 10 degrees or greater.

The lower limit of the diffusion angle of the diffused light emitted by light source 10 is not particularly limited to 3 degrees. The light emitted from light source 10 is associated with not a single pixel of the image sensor but a plurality of pixels of the image sensor.

On the other hand, the upper limit of the diffusion angle of the diffused light emitted by light source 10 is not particularly limited. It is advantages if the diffusion angle causes no deviation of the diffused light, which heads from light source 10 for reflector 20, from reflecting surface 20a of reflector 20. For example, the diffusion angle of the diffused light of light source 10 is preferably 90 degrees or smaller, and more preferably 30 degrees or smaller.

Light source 10 is located to face reflector 20. That is, as shown in (a) of FIG. 2, light source 10 is located in a position overlapping reflector 20 in a plan view. This causes the diffused light emitted from light source 10 to enter reflector 20 to include the vertex of reflector 20. In this embodiment, light source 10 is located to substantially face the center of reflector 20. Specifically, light source 10 is located near central axis J of reflector 20 and at a side of imager 30. It is advantages if light source 10 is adjacent to imager 30.

Reflector 20 is a reflection member with reflecting surface 20a that reflects light. Reflector 20 is, for example, a mirror body with reflecting surface 20a as a mirror surface. The light incident on reflecting surface 20a of reflector 20 is mirror-reflected by reflecting surface 20a.

Reflector 20 has a cone shape with an elongated base and a vertex. In this embodiment, reflector 20 has an elliptical cone shape. Specifically, reflector 20 is a right elliptical cone with an oval base having a short axis along the X-axis and a long axis along the Y-axis. That is, reflector 20 is a horizontally long right elliptical cone elongated laterally (i.e., along the Y-axis). In this case, as shown in (a) of FIG. 2, a<b is satisfied, where a denotes the short diameter of the oval, which is the base of the elliptical cone forming reflector 20, and b denotes the long diameter. As shown in (b) of FIG. 2, a<c<b is satisfied in this embodiment, where c denotes the height of the elliptical cone forming reflector 20 from the base to the vertex. Reflector 20 is not necessarily an exact elliptical cone and may be a polyhedral cone shape that resembles an elliptical cone.

At least the slant surface of reflector 20, which is the lateral surface of the cone body, may be reflecting surface 20a. In this embodiment, the lateral surface of the elliptical cone is reflecting surface 20a. As shown in (b) and (c) of FIG. 2, it is advantages if the lateral surface of the elliptical cone, which is reflecting surface 20a, is a curve recessed inward, but not limited thereto and may be a curve expanding outward.

Reflector 20 reflects the light emitted from light source 10, and radiates the light as radiation light. Specifically, reflector 20 reflects the diffused light emitted from light source 10 in all directions on the XY plane, and radiates the radiation light in all directions throughout 360 degrees on the horizontal plane.

As described above, reflector 20 is an elongated cone body, and thus radiates, as the radiation light, light in a shape with long and short axes. Specifically, reflector 20 is a horizontally long elliptical cone elongated laterally (i.e., along the Y-axis). The light radiated from reflector 20 has thus a vertically long oval shape elongated longitudinally (i.e., along the X-axis) on the XY plane around central axis J (i.e., center O of the oval) of reflector 20. That is, the light radiated from reflector 20 has an oval shape with the long axis along the X-axis and the short axis along the Y-axis.

In this embodiment, the cone body of reflector 20 is disposed with the vertex closer to light source 10 than the base. The lateral surface of the cone body, which is reflecting surface 20a, faces light source 10. That is, reflector 20 is disposed with the vertex of the elliptical cone located below the base of the elliptical cone (i.e., with the base located above the vertex). With this configuration, the light emitted from light source 10 is reflected by reflecting surface 20a of reflector 20, and then, radiated as the radiation light downward from reflector 20. As a result, a light-incident region, in which light is distributed in an oval shape, is formed on the light-incident plane such as the ground.

As shown in FIG. 1, reflector 20 further reflects object light, which is the radiation light reflected by the object and returning. That is, the light emitted from light source 10 and reflected by reflecting surface 20a of reflector 20 is radiated as the radiation light in all directions. Out of the light, the light reflected by the object and returning to reflector 20 is reflected again by reflecting surface 20a of reflector 20.

The object light reflected by reflector 20 is focused by lens 40 onto imager 30. Lens 40 is an imaging lens. Specifically, lens 40 images the object light reflected by reflector 20, at imager 30.

Imager 30 images the object light reflected by reflector 20. Imager 30 is, for example, a 360-degree camera capable of imaging all directions. Specifically, imager 30 includes an image sensor with a pixel region composed of a plurality of pixels arranged in a matrix. In this case, the object light reflected by reflector 20 is captured at the image sensor to generate images of the captured object light. More specifically, imager 30 images object light in all directions to generate omnidirectional (i.e., 360 degrees) images.

The image sensor may be, for example, an image sensor sensitive to the wavelength of the light emitted by light source 10. In this embodiment, since light source 10 emits near-infrared light, the image sensor may be an image sensor sensitive to near-infrared light. The image sensor may be, for example, a silicon-based COMS image sensor or an organic image sensor, but not limited thereto.

Imager 30 is located to face reflector 20. That is, as shown in (a) of FIG. 2, imager 30 is located in a position overlapping reflector 20 in a plan view. In this embodiment, imager 30 is located to substantially face the center of reflector 20. Specifically, the center of imager 30 agrees with central axis J of reflector 20.

It is advantages if the center (i.e., the optical axis) of light source 10 agrees with central axis J of reflector 20. In this embodiment, however, the center of imager 30 agrees with central axis J of reflector 20. There are thus physical constraints between light source 10 and imager 30, which do not allow the optical axis of light source 10 to agree with central axis J of reflector 20. The light-incident angle of the light radiated from reflector 20 becomes thus a little asymmetric with respect to the vertex of the elliptical cone of reflector 20. Therefore, distance measuring device 1 may be applied for purposes accepting such asymmetry. Alternatively, the position of light source 10 may be adjusted as much as possible by reducing the asymmetry of the light-incident angle as much as possible so that the light radiated from reflector 20 has a bilaterally symmetric shape (e.g., an oval shape).

In this embodiment, imager 30 performs exposure in synchronization with the pulsed light emitted from light source 10 to image the object light. This causes controller 50 to measure the distance to the object.

Specifically, controller 50 causes light source 10 to emit pulsed light. The light emitted from light source 10 is reflected by reflector 20 and radiated as the radiation light to reach the object present at distance d from distance measuring device 1. The light is then reflected to return as the object light to reflector 20, and reflected again by reflector 20 to enter the image sensor of imager 30. This object light incident on the image sensor of imager 30 is the light which has returned to distance measuring device 1 at time t after being emitted from light source 10. In order to detect this object light, controller 50 controls the exposure of the image sensor of imager 30 in synchronization with the ON period of the pulsed light from light source 10. Controller 50 can calculate time t.

In this manner, the exposure period of the image sensor of imager 30 is controlled by controller 50 to be synchronized with the ON period of the pulsed light emitted from light source 10. That is, this causes the image sensor of imager 30 to image the object light during the exposure period controlled by controller 50.

The image captured by the image sensor is output to controller 50. Controller 50 calculates distance d from distance measuring device 1 to the object based on time t associated with the light emitted from light source 10 and the image captured by the image sensor. Controller 50 may be, for example, a control circuit such as an integrated circuit (IC) or a central processing unit (CPU).

Figure 3:
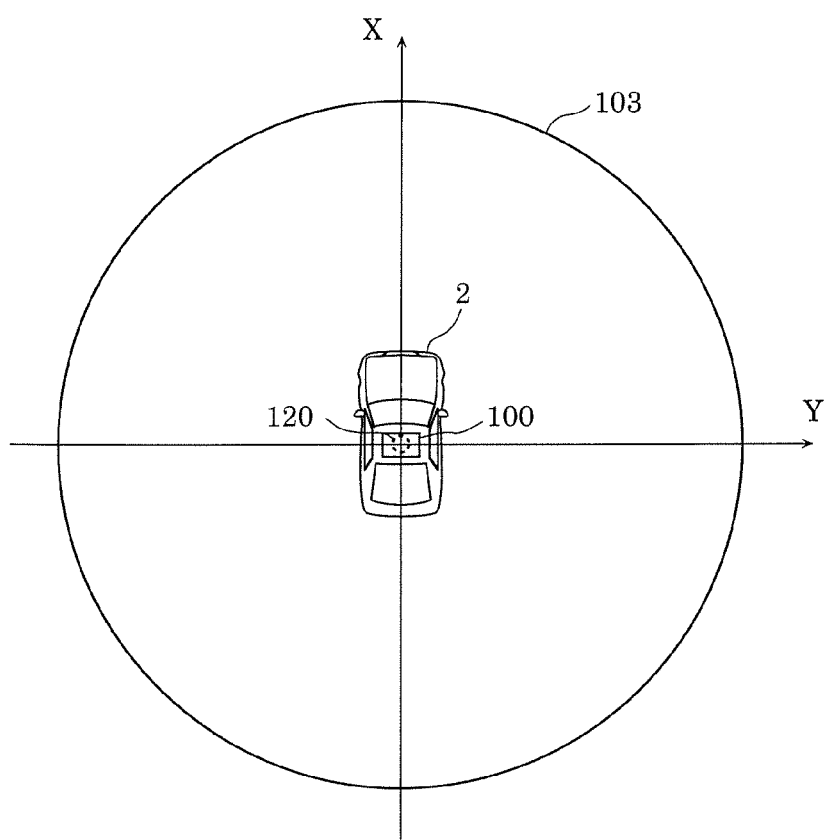
FIG. 3 illustrates an application example where a distance measuring device according to Comparative Example is applied to a vehicle.
Figure 4:
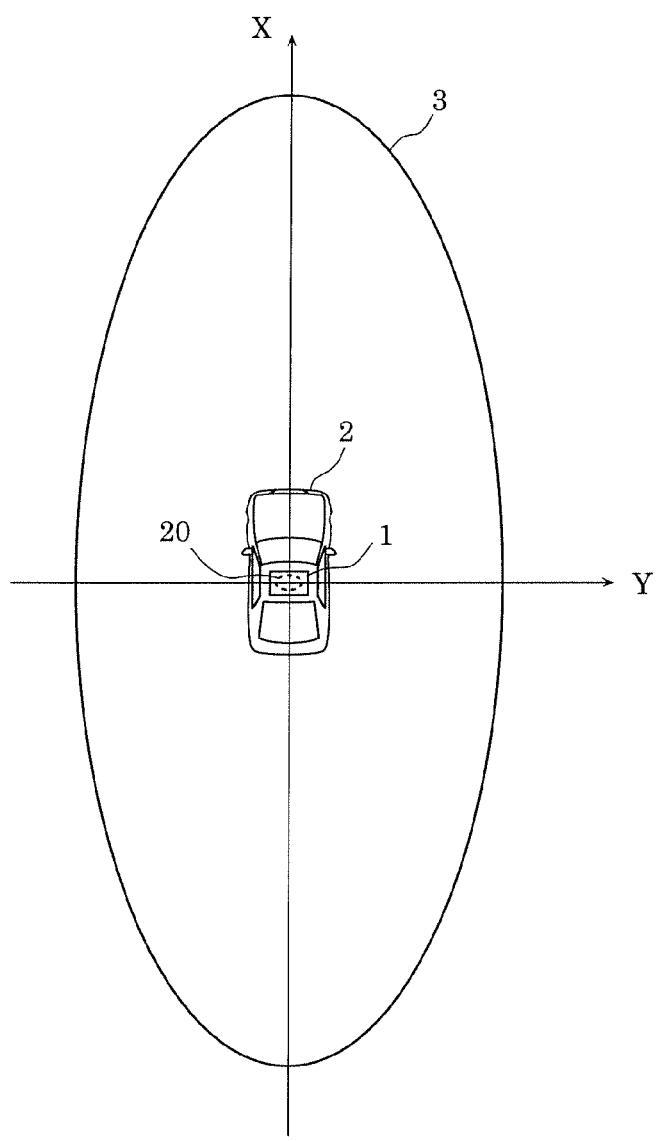
FIG. 4 illustrates an application example where the distance measuring device according to Embodiment 1 is applied to the vehicle.

Next, distance measurement where distance measuring device 1 is applied to a vehicle will be described with reference to FIGS. 3 and 4, while being compared with distance measuring device 100 according to Comparative Example. FIG. 3 illustrates an application example where distance measuring device 100 according to Comparative Example is applied to vehicle 2. FIG. 4 illustrates an application example where distance measuring device 1 according to Embodiment 1 is applied to vehicle 2.

Distance measuring device 1 according to Embodiment 1 employs reflector 20 in the right elliptical cone shape, which is replaced with reflector 120 in a right cone shape in distance measuring device 100 according to Comparative Example shown in FIG. 3.

In this case, as shown in FIG. 3, in vehicle 2 provided with distance measuring device 100 according to Comparative Example, a laser beam emitted from light source 10 (not shown) is reflected by reflector 120 in the right cone shape, and diffused isotropically in all directions of vehicle 2. Then, circular radiation light 103 is radiated around vehicle 2. Accordingly, the measurable distances of vehicle 2, which is mounted with distance measuring device 100 according to Comparative Example, are the same in all directions.

By contrast, as shown in FIG. 4, distance measuring device 1 according to this embodiment employs reflector 20 in the right elliptical cone shape. Distance measuring device 1 is placed in vehicle 2 so that reflector 20 in the right elliptical cone shape has the long axis extending laterally (i.e., along the Y-axis).

With this configuration, a laser beam emitted from light source 10 (not shown) is reflected by reflector 20 and diffused like in distance measuring device 100 according to Comparative Example. In distance measuring device 1, however, since reflector 20 has the right elliptical cone shape, the beam is diffused not isotropically but anisotropically in all directions of vehicle 2. Specifically, the laser beam emitted from light source 10 becomes oval radiation light 3 to be radiated around vehicle 2. In this embodiment, radiation light 3 radiated from reflector 20 is projected on the ground as an oval light-incident region having the long axis in the moving direction of vehicle 2 (i.e., along the X-axis) and the short axis in the transverse direction of vehicle 2 (i.e., along the Y-axis).

In this manner, distance measuring device 1 is placed so that the long axis of radiation light 3 extends in the moving direction of vehicle 2 (i.e., along the X-axis) in this embodiment. Specifically, the long axis of radiation light 3 agrees with the moving direction of vehicle 2. This increases the measurable distance in the moving direction of vehicle 2 relative to that in the transverse direction of vehicle 2. That is, the measurable distance decreases in the transverse direction of vehicle 2, which does not require much detection of the object, while the measurable distance increases in the moving direction of vehicle 2, which requires as far as possible detection of an object. This causes vehicle 2 to safely travel, while detecting objects (e.g., obstacles or buildings) around the vehicle. The use of distance measuring device 1 causes vehicle 2 to autonomously travel, while detecting surrounding objects.

Figure 5:
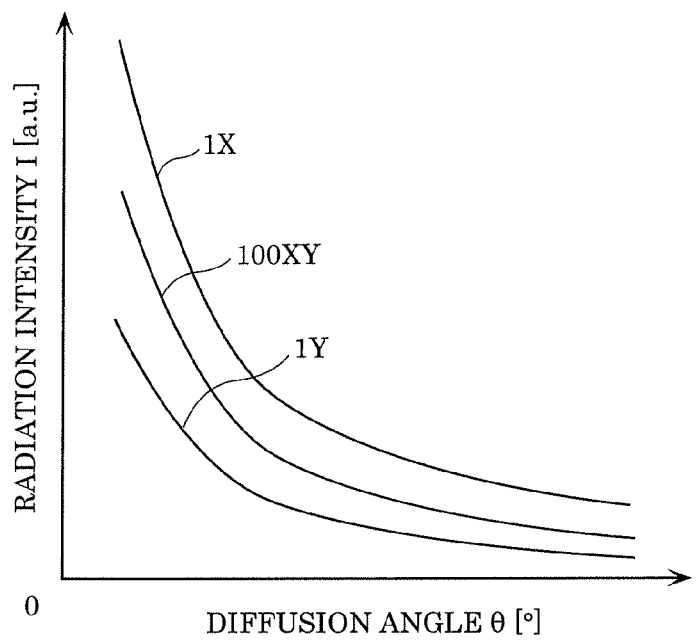
FIG. 5 illustrates the relation between diffusion angle θ of diffused light emitted from a light source, and the radiation intensity of light radiated from a reflector.

With respect to distance measuring device 100 according to Comparative Example and distance measuring device 1 according to this embodiment, the relation between diffusion angle θ of the diffused light emitted from light source 10 and radiation intensity I of the light radiated from reflectors 120 and 20 will be described with reference to FIG. 5. FIG. 5 illustrates the relation between diffusion angle θ of the diffused light emitted from light source 10 and radiation intensity I of the light radiated from reflectors 120 and 20. The light emitted from light source 10 enters reflectors 120 and 20 at a diffusion angle including the vertices of reflectors 120 and 20.

As shown in FIG. 5, diffusion angle θ of the diffused light emitted from light source 10 is inversely proportional to radiation intensity I of the light radiated from reflectors 120 and 20. Specifically, the greater diffusion angle θ is, the lower radiation intensity I is, that is, the smaller diffusion angle θ is, the higher radiation intensity I is. Therefore, smaller diffusion angle θ is advantages in increasing the irradiation distance of the radiation light so that the light of light source 10 reaches a farther point.

At this time, assume that measuring device 100 according to Comparative Example is applied to vehicle 2. Since reflector 120 has the right cone shape, the relational expressions between diffusion angle θ and radiation intensity I in the moving and transverse directions of vehicle 2 are both represented by curve 100XY.

On the other hand, assume that distance measuring device 1 according to this embodiment is applied to vehicle 2. Since reflector 20 has the right elliptical cone shape, the relational expressions between diffusion angle θ and radiation intensity I in the moving and transverse directions of vehicle 2 are represented by different curves.

Specifically, the relational expression between diffusion angle θ and radiation intensity I in the moving direction of vehicle 2 is represented by curve 1X, while the relational expression between diffusion angle θ and radiation intensity I in the transverse direction of vehicle 2 is represented by curve 1Y. As indicated by curves 1X and 1Y, radiation intensity I is higher in the moving direction of vehicle 2 than in the transverse direction of vehicle 2 at the same diffusion angle θ.

As indicated by curves 1X, 1Y, and 100XY, distance measuring device 1 according to this embodiment provides higher radiation intensity I in the moving direction of vehicle 2 than distance measuring device 100 according to Comparative Example at the same diffusion angle θ. On the other hand, distance measuring device 1 according to this embodiment provides lower radiation intensity I in the transverse direction of vehicle 2 than distance measuring device 100 according to Comparative Example at the same diffusion angle θ.

In this manner, the proportion of the radiation intensity (i.e., the irradiation distance) between the moving direction and transverse direction can be changed simply by replacing reflector 120 in the right cone shape with reflector 20 in the right elliptical cone shape. Specifically, the replacement of reflector 120 in the right cone shape with reflector 20 in the right elliptical cone shape changes the proportion of the light emitted from light source 10 so that the radiation intensity is higher in the moving direction than in the transverse direction. That is, the radiation intensity can be concentrated in the moving direction.

Accordingly, for example, a larger amount of light is diffused and radiated in the moving direction of vehicle 2. This causes vehicle 2 to detect an object present in the moving direction earlier and to measure the distance to the object, while moving. If the forward irradiation distance needs to be longer than the backward irradiation distance in the moving direction, it is advantages if light source 10 is arranged more forward than imager 30 in the moving direction.

As described above, distance measuring device 1 according to this embodiment includes light source 10, reflector 20, and imager 30. Light source 10 emits pulsed light. Reflector 20 reflects the light emitted from light source 10, radiates the light as the radiation light, and reflects, as object light, the radiation light reflected by the object and returning. Imager 30 images the object light reflected by reflector 20. The light emitted from light source 10 is the diffused light. Light source 10 and imager 30 are located to face reflector 20. This configuration allows for measurement of the distance to the object at a wider range of angle.

In addition, in distance measuring device 1 according to this embodiment, reflector 20 reflects the light emitted from light source 10, and radiate the light as radiation light in the shape with long and short axes. Accordingly, distance measuring device 1 is placed, while causing the direction requiring as far as possible detection of an object to correspond to the long axis of the radiation light, and the direction not requiring much detection of an object to correspond to the short axis of the radiation light. This increases the measurable distance in the direction requiring as far as possible detection of an object, relative to that in the direction not requiring much detection of an object.

In this manner, the measurable distances are increased not in all directions. Only the measurable distance is decreased in a specific first direction, while the measurable distance is increased in a second direction different from the first direction. This reduces an increase in the components for increasing the measurable distance. Accordingly, a useless increase in the size of distance measuring device 1 is reduced.

In this manner, this embodiment provides miniaturized distance measuring device 1 with an increased measurable angle, while easily increasing the measurable distance in the direction requiring as far as possible detection of an object, as compared to the measurable distance in the direction not requiring much detection of an object.

In this embodiment, reflector 20 has the cone shape with the elongated base and the vertex. Reflector 20 is located so that the vertex is closer to light source 10 than the base is.

This configuration causes reflector 20 to easily radiate the light of light source 10 in all directions, that is, easily increases the measurable angle.

In this embodiment, reflector 20 has the elliptical cone shape.

With this configuration, the light emitted from light source 10 is reflected by reflector 20 and radiated as oval radiation light in all directions. Accordingly, the measurable distance range has an oval shape.

In this embodiment, the lateral surface (i.e., reflecting surface 20a) of the elliptical cone forming reflector 20 is a curve recessed inward.

This configuration allows for projection of the light radiated from reflector 20 at a uniform intensity toward the ground.

In this embodiment, imager 30 is located to substantially face the center of reflector 2.

This allows for highly accurate measurement of the distance to the object.

In this embodiment, light source 10 is located to substantially face the central region of reflector 20.

This allows for further miniaturization of distance measuring device 1. Since light source 10 is located to substantially face the central region of reflector 20, the light emitted from light source 10, reflected by reflector 20 and radiated as the radiation light has a symmetrical shape. A desired distance measuring range is thus achieved. For example, if reflector 20 has a right elliptical cone shape, the radiation light has an oval shape symmetrical vertically and horizontally. Accordingly, the measurable distance range has an oval shape.

In this embodiment, it is advantages if the light emitted by light source 10 is a laser beam with a diffusion angle of 3 degrees or greater.

With this configuration, the light emitted by light source 10 is reflected by reflector 20 to be, as the radiation light, radiated in a desired wide range.

Embodiment 2

Figure 6:
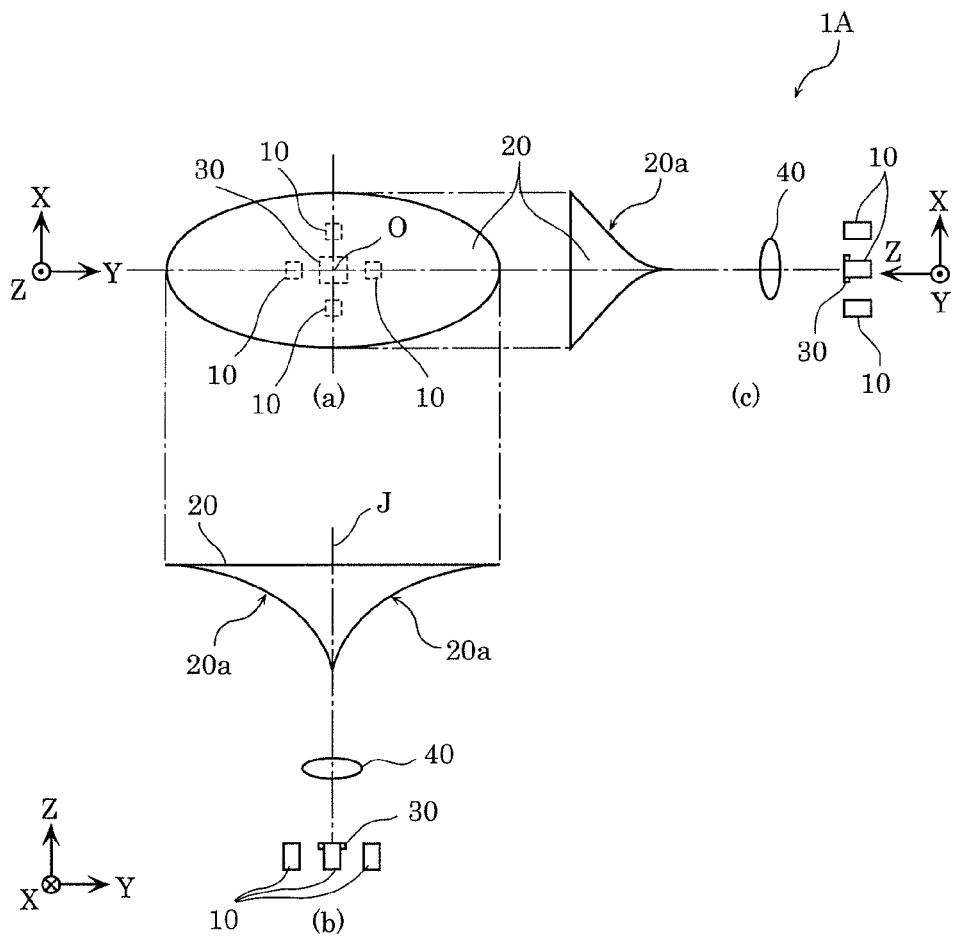
FIG. 6 illustrates a schematic configuration of a distance measuring device according to Embodiment 2.

Next, distance measuring device 1A according to Embodiment 2 will be described with reference to FIG. 6. FIG. 6 illustrates a schematic configuration of distance measuring device 1A according to Embodiment 2. In FIG. 6, (a) is a plan view, (b) is a front view, and (c) is a side view. Controller 50 is not shown in the figures.

As shown in (a) to (c) of FIG. 6, a plurality of light sources 10 are arranged in distance measuring device 1A according to this embodiment, unlike distance measuring device 1 according to Embodiment 1. Specifically, while distance measuring device 1 according to Embodiment 1 described above includes single light source 10 (i.e., light-emitting element), distance measuring device 1A according to this embodiment includes four light sources 10. Each light source 10 is, for example, a laser element that emits pulsed light like in Embodiment 1. Each light source 10 emits diffused light at a predetermined diffusion angle.

In this embodiment, the plurality of light sources 10 are arranged evenly around the vertex of reflector 20 in the right elliptical cone shape. Specifically, four light sources 10 are arranged circumferentially around the vertex of reflector 20 at an interval of 90 degrees.

In this embodiment, the diffusion angle of the light emitted from each of four light sources 10 is smaller than that of the light emitted from light source 10 according to Embodiment 1 described above. The irradiation range of the light emitted from four light sources 10 and radiated from reflector 20 is the same as in Embodiment 1 described above. That is, even if the light from each light source 10 has a small diffusion angle, a wide measurable angle is maintained, because the light incident on reflector 20 is compensated by using the plurality of light sources 10.

As described above, distance measuring device 1A according to this embodiment provides the same or similar advantages as the distance measuring device in Embodiment 1 described above. Specifically, a miniaturized device with an increased measurable angle is achieved, while easily increasing the measurable distance in the direction requiring as far as possible detection of an object, as compared to the measurable distance in the direction not requiring much detection of an object.

In this embodiment, the plurality of light sources 10 are arranged.

This hinders concentration of the intensity of single light source 10 to increase in the irradiation range of the radiation light. This disperses the heat generation of light sources 10, and thus provides highly reliable distance measuring device 1A that is less influenced by the heat.

Embodiment 3

Figure 7A:
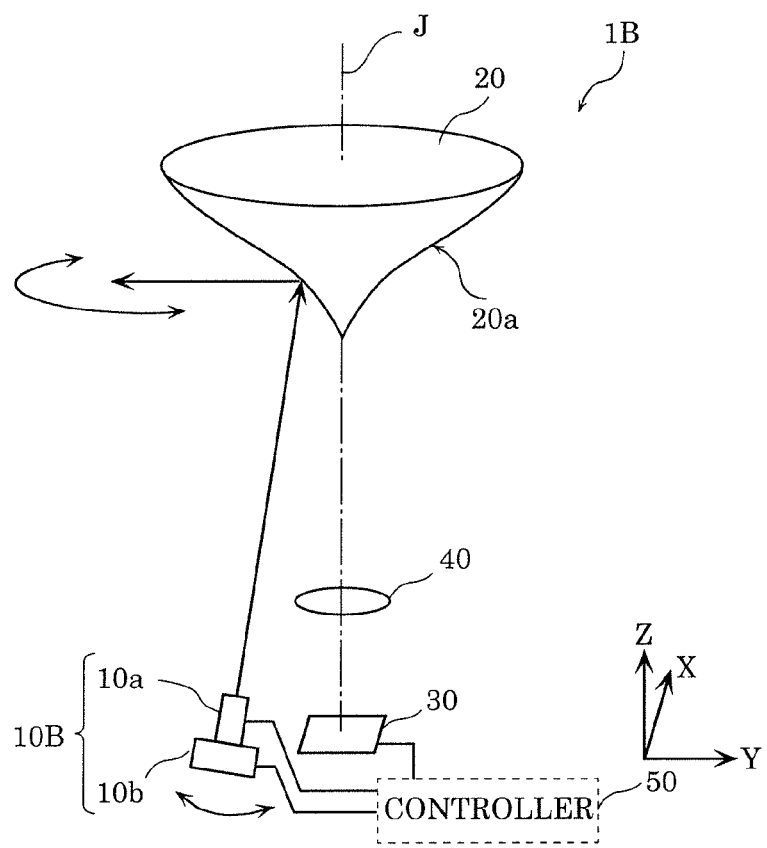
FIG. 7A illustrates a schematic configuration of a distance measuring device according to Embodiment 3.
Figure 7B:
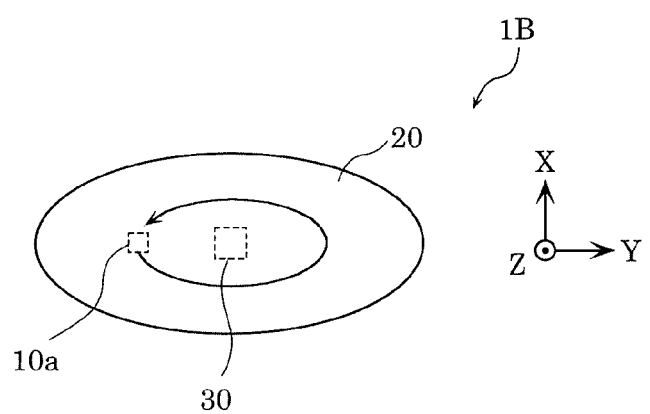
FIG. 7B illustrates a locus of the light emitted from a light source and incident on a reflector, on a reflecting plane in the distance measuring device according to Embodiment 3.

Next, distance measuring device 1B according to Embodiment 3 will be described with reference to FIGS. 7A and 7B. FIG. 7A illustrates a schematic configuration of distance measuring device 1B according to Embodiment 3. FIG. 7B illustrates the locus of the light emitted from light source 10B and incident on reflector 20, on reflecting surface 20a in this distance measuring device 1B. In FIGS. 7A and 7B, solid arrows represent the locus of the light emitted from light source 10B.

Distance measuring device 1B according to this embodiment is different from distance measuring device 1 according to Embodiment 1 described above in the configuration of the light source. Specifically, as shown in FIG. 7A, light source 10B includes light-emitting element 10a and actuator 10b in distance measuring device 1B according to this embodiment.

Light-emitting element 10a emits pulsed light. Specifically, light-emitting element 10a emits rectangular pulsed light. In this embodiment, light-emitting element 10a may be the same or similar to the light-emitting element in Embodiment 1 described above. For example, light-emitting element 10a may be a laser element that emits a laser beam as diffused light at a predetermined diffusion angle.

Actuator 10b dynamically displaces light-emitting element 10a to rotate the light emitted from light source 10B about the center of reflector 20 as the center of rotation. Specifically, as shown in FIG. 7B, actuator 10b rotates light-emitting element 10a about central axis J of reflector 20 in the right elliptical cone shape. With this configuration, the diffused light scanned by the rotation of light-emitting element 10a enters reflecting surface 20a of reflector 20, and the light associated with the rotation of light-emitting element 10a is radiated from reflector 20.

In this manner, the control of light-emitting element 10a using actuator 10b allows for radiation of the light, which has been emitted from light source 10B (i.e., light-emitting element 10a), from reflector 20 in the same or similar radiation range as in Embodiment 1 described above, even with the following configuration. The diffusion angle of the light emitted from light source 10B is smaller than that of the light emitted from light source 10 according to Embodiment 1 described above, like in Embodiment 2 described above. That is, even single light-emitting element 10a, which emits light at a small diffusion angle, achieves the irradiation range of radiation light that provides a wide measurable angle, by using actuator 10b to rotate light-emitting element 10a.

In this embodiment, the radiation light associated with the rotation of light-emitting element 10a is circumferentially projected from reflector 20. The object light associated with the rotation of light-emitting element 10a is thus incident on imager 30. In this case, the exposure time of imager 30 (i.e., the image sensor) is synchronized with the pulsed light emitted from light-emitting element 10a. Controller 50 acquires information on when and on which imaging region of the image sensor the object light is incident.

Figure 8:
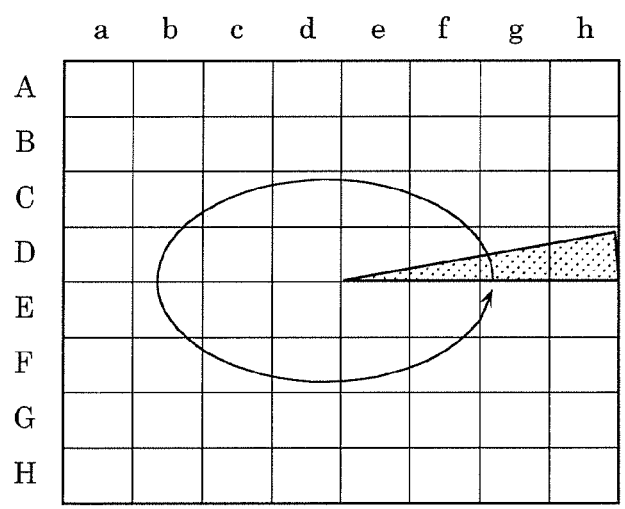
FIG. 8 schematically illustrates an imaging region of an image sensor of an imager in the distance measuring device according to Embodiment 3.

For this purpose, in this embodiment, not all the imaging regions are exposed to the light to read out images, but only the imaging regions to which the object light returns are exposed to the light to read out images. How to read out images will be described with reference to FIG. 8. FIG. 8 schematically illustrates the imaging regions of the image sensor of imager 30 in distance measuring device 1B according to Embodiment 3. In FIG. 8, the hatched area represents the region on which the object light is incident, the arrow represents the rotation direction of the object light incident in association with the rotation of light-emitting element 10a.

As shown in FIG. 8, the pixel region of the image sensor of imager 30 is divided into a plurality of regions to be read out. The plurality of regions to be read out are set in advance. Controller 50 figures out, in advance, address information associated with each of the plurality of regions to be read out. For example, FIG. 8 illustrates that the pixel region is divided into 8×8, that is 64 regions to be read out. Row addresses are represented by A to H, and column addresses are represented by a to h. Each region to be read out can be expressed by one of the row addresses and one of the column addresses.

Controller 50 includes a readout circuit that performs exposure to read out images captured by the image sensor of imager 30. For example, controller 50 includes an address recorder for reading out an image from each the plurality of regions to be read out.

In this embodiment, since the light of rotated light-emitting element 10a is reflected by reflector 20, the object light returning to reflector 20 is partially incident on the pixel regions of the image sensor.

Thus, the readout circuit exposes not all the pixels of the pixel region to the light at the same time to read out captured images, but only the regions of interest (ROIs) to which the object light returns are exposed to the light to read out captured partial images. Specifically, the readout circuit exposes, out of the plurality of regions to be read out, regions on which the object light is incident, to the light to sequentially read out the captured partial images in synchronization with the rotation of the light emitted from light source 10B.

For example, assume that the object light enters the hatched area shown in FIG. 8. The readout circuit exposes, out of 64 regions to be read out, only four regions to be read out expressed by row D×column e, row D×column f, row D×column g, and row D×column h to the light to read out four captured partial images. This readout circuit sequentially performs control in synchronization with the light emitted from light source 10B.

As described above, distance measuring device 1B according to this embodiment provides the same or similar advantages as the distance measuring device in Embodiment 1 described above. Specifically, a miniaturized device with an increased measurable angle is achieved, while easily increasing the measurable distance in the direction requiring as far as possible detection of an object, as compared to the measurable distance in the direction not requiring much detection of an object.

In this embodiment, light source 10B includes light-emitting element 10a that emits pulsed light, and actuator 10b that dynamically displaces light-emitting element 10a.

This configuration achieves a measuring range using radiation light with a light intensity equivalent to that in Embodiment 2 described above, and requires a smaller number of light-emitting elements 10a than in Embodiment 2.

In this embodiment, the pixel region of the image sensor of imager 30 is divided into a plurality of regions to be read out. Distance measuring device 1B further includes the readout circuit that reads out images captured by imager 30 by exposure. The readout circuit exposes, out of the plurality of regions to be read out of the image sensor, only regions on which the object light is incident, to the light to sequentially read out the captured partial images in synchronization with the rotation of the light emitted from light source 10B.

This configuration reduces the amount of data in reading out the images captured by the pixel region, as compared to the case of reading out all regions of the pixel region. For example, in FIG. 8, the amount of data in reading out the captured images decreases to 4/64. This allows for efficient and rapid imaging of the object light, which leads to reduction in the time required for distance measurement.

Embodiment 4

Figure 9A:
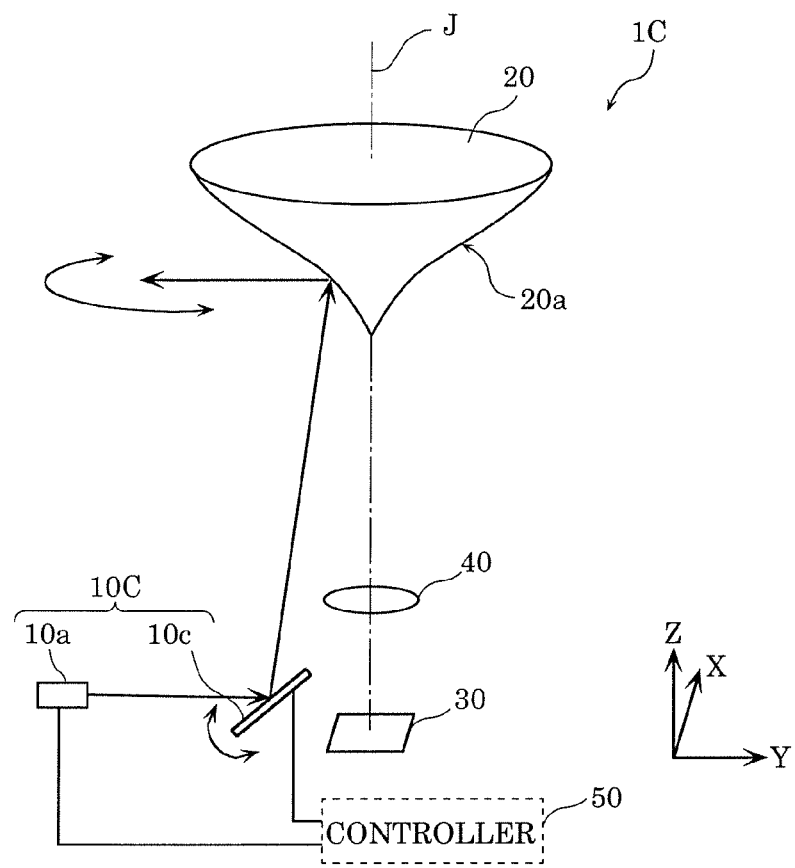
FIG. 9A illustrates a schematic configuration of a distance measuring device according to Embodiment 4.
Figure 9B:
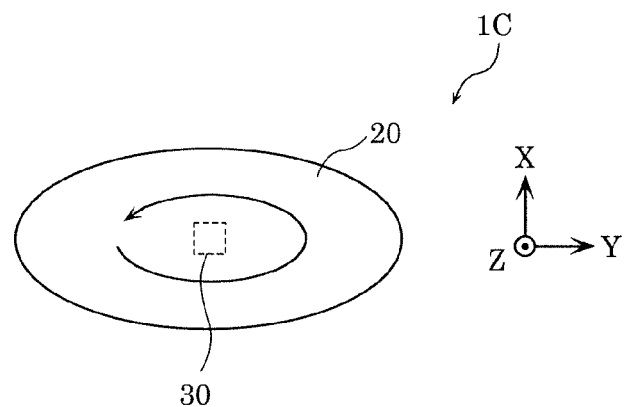
FIG. 9B illustrates a locus of the light emitted from a light source and incident on a reflector, on a reflecting plane in the distance measuring device according to Embodiment 4.

Next, distance measuring device 1C according to Embodiment 4 will be described with reference to FIGS. 9A and 9B. FIG. 9A illustrates a schematic configuration of distance measuring device 1C according to Embodiment 4. FIG. 9B illustrates the locus of the light emitted from light source 10C and incident on reflector 20, on reflecting surface 20a in distance measuring device 1C. In FIGS. 9A and 9B, solid arrows represent the locus of the light emitted from light source 10C.

Distance measuring device 1C according to this embodiment is different from distance measuring device 1 according to Embodiment 1 described above in the configuration of the light source. Specifically, as shown in FIG. 9A, light source 10C includes light-emitting element 10a and mirror 10c in distance measuring device 1C according to this embodiment.

Light-emitting element 10a is almost the same as in Embodiment 3 described above. In this embodiment, however, light-emitting element 10a is fixed and does not change its position.

Mirror 10c reflects the light emitted from light-emitting element 10a to rotate the light emitted from light source 10 about the center of reflector 20 as the center of rotation. Specifically, mirror 10c is a galvanometer mirror that controls the angle of the light incident from light-emitting element 10a on reflector 20. Specifically, as shown in FIG. 9B, mirror 10c controls the orientation of the light emitted from light-emitting element 10a to rotate the light emitted from light source 10C about central axis J of reflector 20 in the right elliptical cone shape. With this configuration, the light scanned by the rotation of the emitted from light source 10C enters reflecting surface 20a of reflector 20, and the light associated with the rotation of the light of source body 10C is radiated from reflector 20.

In this manner, the control of the light of light-emitting element 10a using mirror 10c allows for radiation of the light, which has been emitted from light source 10C, from reflector 20 in the same or similar radiation range as in Embodiment 1 described above, even with the following configuration. The diffusion angle of the light emitted from light source 10C is smaller than that of the light emitted from light source 10 according to Embodiment 1 described above, like in Embodiment 3 described above. That is, even single light-emitting element 10a, which emits light at a small diffusion angle, achieves the irradiation range of radiation light that provides a wide measurable angle, by using mirror 10c to control the orientation of the light emitted from light-emitting element 10a.

In this embodiment, the radiation light associated with the rotation of the light of light source 10C is circumferentially projected from reflector 20. The object light associated with the rotation of the light of light source 10C is thus incident on imager 30. Therefore, in this embodiment as well, the readout circuit like in Embodiment 3 is used to expose not all imaging regions to the light to read out images, but to expose only the imaging regions to which the object light returns to the light to read out images.

As described above, distance measuring device 1C according to this embodiment provides the same or similar advantages as the distance measuring device in Embodiment 1 described above. Specifically, a miniaturized device with an increased measurable angle is achieved, while easily increasing the measurable distance in the direction requiring as far as possible detection of an object, as compared to the measurable distance in the direction not requiring much detection of an object.

In this embodiment, light source 10C includes light-emitting element 10a, and mirror 10c that changes the orientation of the light emitted from light-emitting element 10a.

This configuration provides the same or similar advantages as in Embodiment 3 described above. That is, this configuration achieves a measuring range using radiation light with a light intensity equivalent to that in Embodiment 2 described above, and requires a smaller number of light-emitting elements 10a than in Embodiment 2. In this embodiment, light-emitting element 10a is fixed to achieve stable electrical drive, thereby improving the reliability.

Distance measuring device 1C according to this embodiment includes a readout circuit like in Embodiment 3 described above. The readout circuit exposes, out of the plurality of regions to be read out of the image sensor, only regions on which the object light is incident, to the light to sequentially read out the partial images captured in synchronization with the rotation of the light emitted from light source 10C.

This allows for efficient and rapid imaging of the object light, which leads to reduction in the time required for distance measurement like in Embodiment 3 described above.

Embodiment 5

Figure 10:
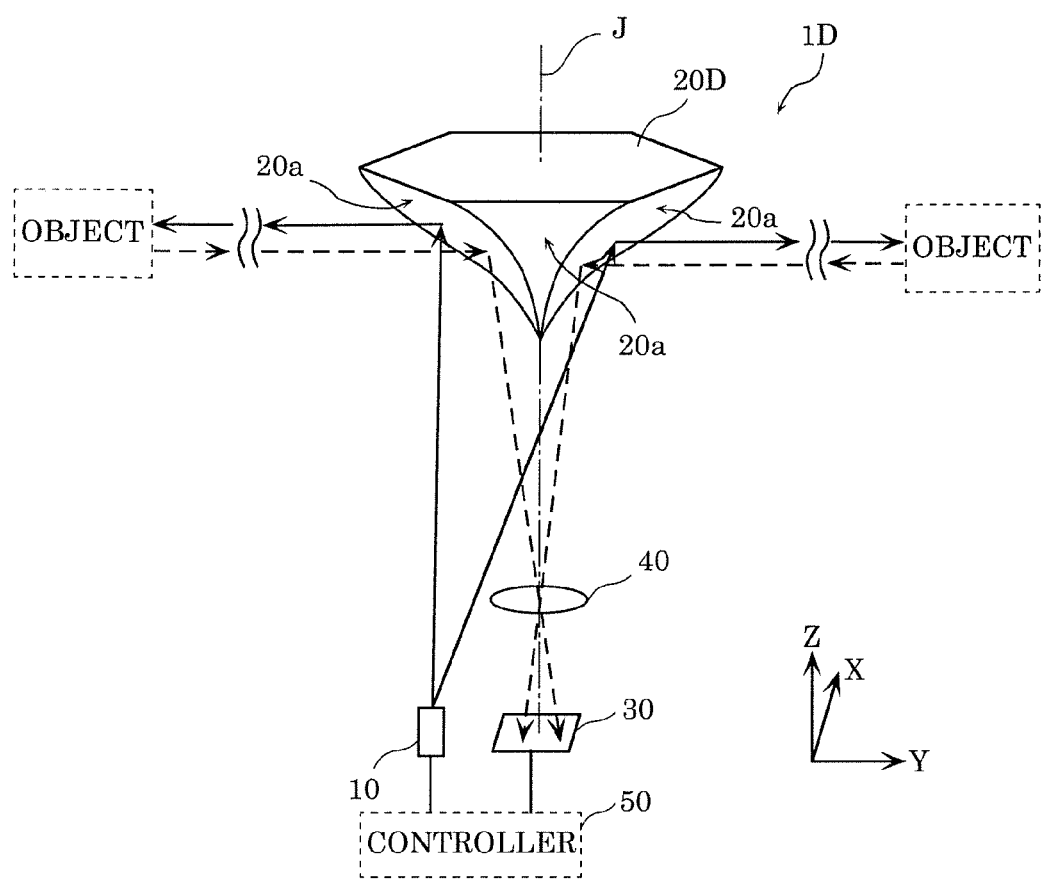
FIG. 10 illustrates a schematic configuration of a distance measuring device according to Embodiment 5.
Figure 11:
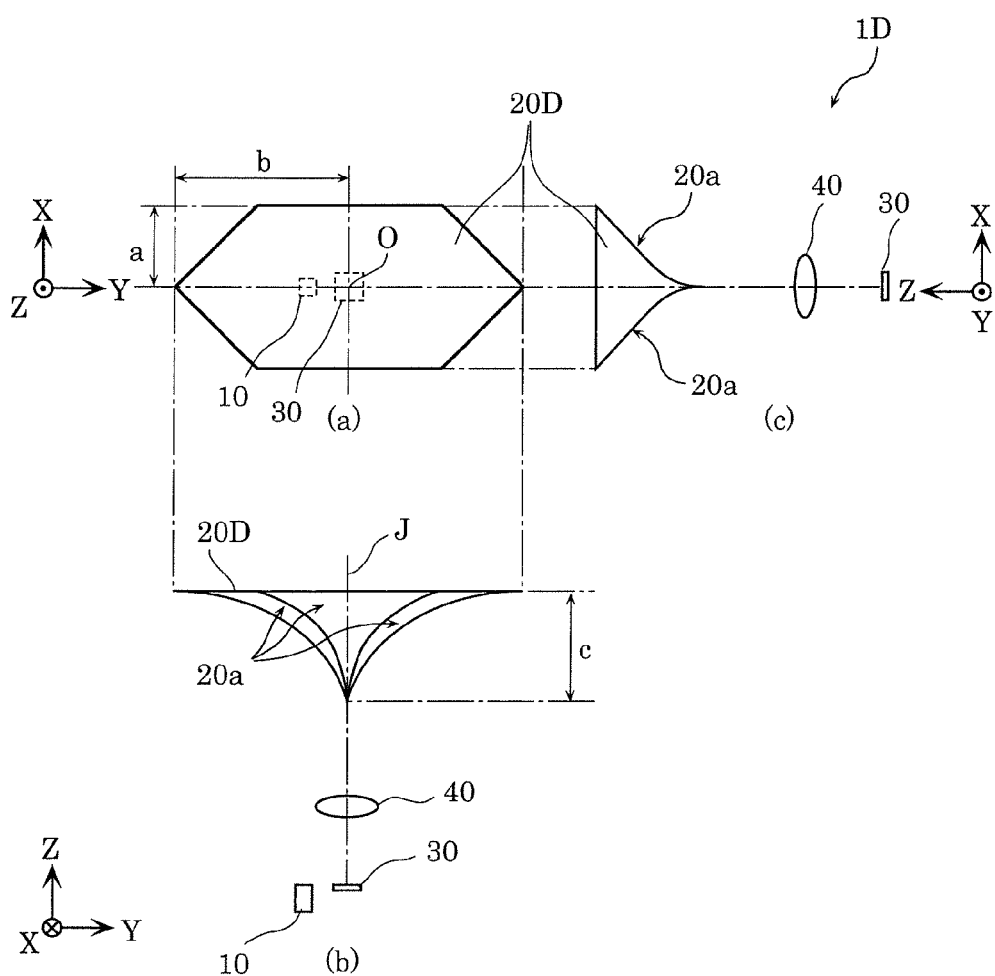
FIG. 11 illustrates another schematic configuration of the distance measuring device according to Embodiment 5.

Next, distance measuring device 1D according to Embodiment 5 will be described with reference to FIGS. 10 and 11. FIGS. 10 and 11 illustrate a schematic configuration of distance measuring device 1D according to Embodiment 5. In FIG. 10, solid arrows represent the locus of the light emitted from light source 10, broken arrows represent the locus of the light emitted from light source 10, reflected by an object, and returning. In FIG. 11, (a) is a plan view, (b) is a front view, and (c) is a side view.

Distance measuring device 1D according to this embodiment is different from distance measuring device 1 according to Embodiment 1 described above in the shape of the reflector. Specifically, while reflector 20 has the right elliptical cone shape with the oval base in Embodiment 1 described above, reflector 20D according to this embodiment has a polyhedral cone shape with an elongated polygonal base as shown in FIGS. 10 and 11.

Specifically, reflector 20D is a horizontally long hexagonal pyramid with an elongated hexagonal base having a short axis along the X-axis and a long axis along the Y-axis. In this case, as shown in (a) of FIG. 11, $a<b$ is satisfied, where a denotes the short diameter of the hexagonal shape, which is the base of the hexagonal pyramid forming reflector 20D, and b denotes the long diameter. In this embodiment, $a<c<b$ is satisfied, where c denotes the height of the hexagonal pyramid forming reflector 20D from the base to the vertex.

In this embodiment as well, at least the slant surface of reflector 20D, which is the lateral surface of the hexagonal pyramid, may be reflecting surface 20a. As shown in (b) and (c) of FIG. 11, it is advantages if the lateral surface of the hexagonal pyramid, which is reflecting surface 20a, is a curve recessed inward, but not limited thereto and may be a curve expanding outward. The lateral surface of the hexagonal pyramid, which is reflecting surface 20a, is not limited to the curve.

As described above, distance measuring device 1D according to this embodiment provides the same or similar advantages as the distance measuring device in Embodiment 1 described above. Specifically, a miniaturized device with an increased measurable angle is achieved, while easily increasing the measurable distance in the direction requiring as far as possible detection of an object, as compared to the measurable distance in the direction not requiring much detection of an object.

In this embodiment, reflector 20D has the cone shape with the elongated base and the vertex like reflector 20 in Embodiment 1 described above. However, reflector 20D according to this embodiment has the polyhedral cone shape with an elongated polygonal base.

This configuration causes reflector 20D to reflect the light emitted from light source 10 and to radiate the light as substantially polygonal radiation light in all directions. This allows for formation of a substantially polygonal measurable distance range.

The polyhedral cone shape of reflector 20 allows for image processing, while the pixel regions on which the object light to be imaged is incident is clearly associated with the surfaces of the polyhedral cone. This facilitates the arithmetic algorithm.

In this embodiment, the lateral surfaces (i.e., reflecting surfaces 20a) of the polyhedral cone forming reflector 20D are curves recessed inward.

This configuration allows for projection of the light radiated from reflector 20D at a uniform intensity toward the ground.

While being applied to Embodiment 1, this embodiment is also applicable to Embodiments 2 to 4.

Variations

While the distance measuring device according to the present disclosure has been described based on the embodiments as described above, the present disclosure is not limited to the embodiments described above.

Figure 12:
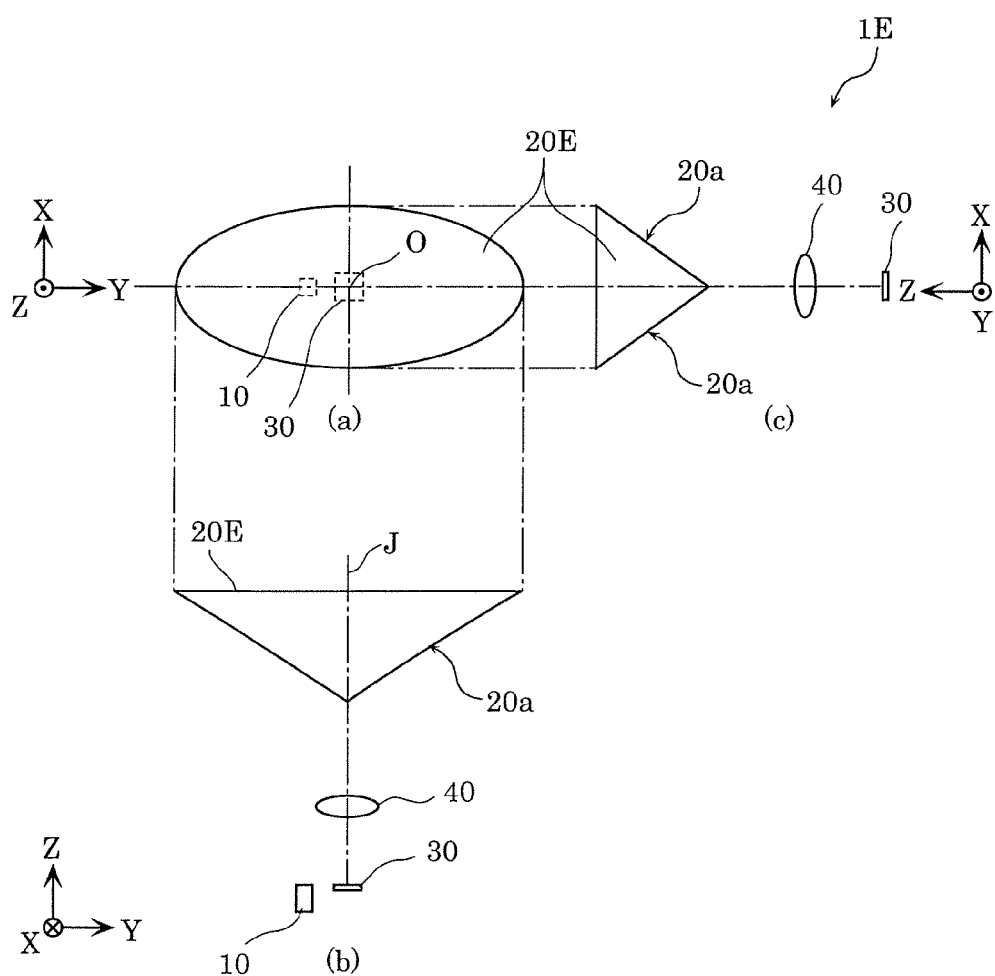
FIG. 12 illustrates a schematic configuration of a distance measuring device according to Variation 1.

For example, reflecting surface 20a (i.e., the lateral surface) of reflector 20 is a curve in Embodiment 1 described above, the shape is not limited thereto. Instead, as in distance measuring device 1E shown in FIG. 12, reflector 20E may have an elliptical cone, in which the plane including central axis J has an isosceles triangle cross-section. In Embodiments 2 to 5 as well, reflecting surface 20a (i.e., the lateral surface) of the reflector is not limited thereto the curve. Instead, the reflector may be a cone body, in which the plane including central axis J has an isosceles triangle cross-section.

Figure 13:
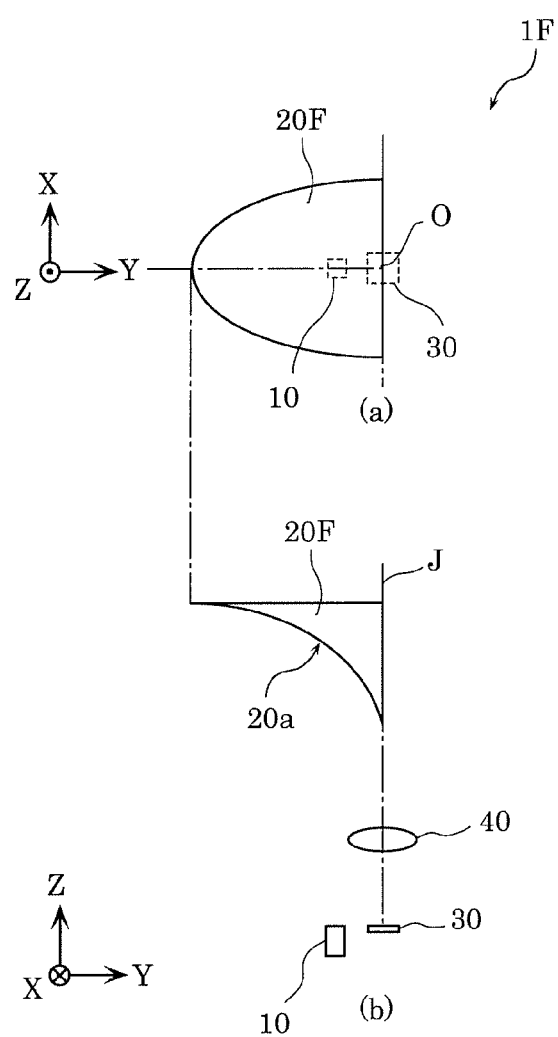
FIG. 13 illustrates a schematic configuration of a distance measuring device according to Variation 2.

The whole cone body is used as the reflector in each of the embodiments described above, but not limited thereto. A part of the cone body may be used. For example, as in distance measuring device 1F shown in FIG. 13, reflector 20F may be the left half of an elliptical cone divided into two on the plane including the short axis. In this case, the region on which the light radiated from reflector 20F is incident is the left half of that in FIG. 4. In FIG. 13, lens 40 may be a half. Distance measuring device 1F with such a configuration may be placed, for example, on the left of the vehicle. In addition, a distance measuring device including the right half of the elliptical cone as a reflector may be placed on the right of the vehicle. This placement allows for radiation of light in all directions of vehicle 2.

Figure 14:
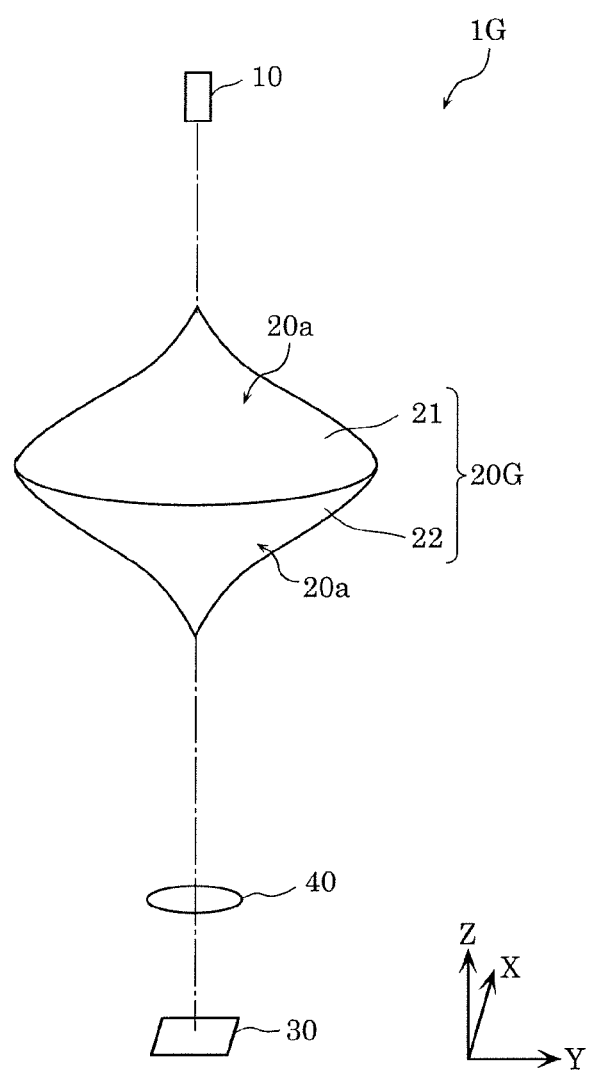
FIG. 14 illustrates a schematic configuration of a distance measuring device according to Variation 3.

In each of the embodiments described above, the reflector is a single cone body, but not limited thereto. As in distance measuring device 1G shown in FIG. 14, two cone bodies of; first reflector 21 in a right elliptical cone shape; and second reflector 22 in a right elliptical cone shape may form reflector 20G. First reflector 21 and second reflector 22 are arranged so that the bases face each other. That is, the vertices of first reflector 21 and second reflector 22 face opposite directions. In this case, light source 10 is located to face first reflector 21, while imager 30 is located to face second reflector 22. In distance measuring device 1G with such a configuration, the light emitted from light source 10 is reflected by reflecting surface 20a of first reflector 21 of reflector 20G and radiated as radiation light in all directions. Out of the radiation light, the light reflected by the object and returning to reflector 20G is reflected by reflecting surface 20a of second reflector 22 of reflector 20G, imaged by lens 40 and incident on imager 30. Accordingly, the distance to the object is measured.

While in each of the embodiments described above, the laser element is used as the light-emitting element forming the light source, the configuration is not limited thereto. Any other solid light-emitting element such as a light emitting diode (LED) may be used as the light-emitting element forming the light source.

While an example has been described in each embodiment, where the distance measuring device is placed in a vehicle, the location is not limited thereto. For example, the distance measuring device may be placed in any moving object other than a vehicle or in an immobile object.

The distance measuring device in each of the embodiments described above may be a distance measuring system.

Besides the embodiments and variations, those skilled in the art will readily appreciate that many modifications and free combination of constituent elements and functions are possible in the exemplary embodiments without materially departing from the novel teachings and advantages of the present disclosure. Accordingly, all such modifications are intended to be included within the scope of the present disclosure.

INDUSTRIAL APPLICABILITY

The technique of the present disclosure is applicable as, for example, a distance measuring device such as a perimeter monitoring system for a vehicle or a robot.

REFERENCE MARKS IN THE DRAWINGS 1, 1A, 1B, 1C, 1D, 1E, 1F, 1G distance measuring device
2 vehicle
3 radiation light
10, 10B, 10C light source
10a light-emitting element
10b actuator
10c mirror
20, 20D, 20E, 20F, 20G reflector
20a reflecting surface
21 first reflector
22 second reflector
30 imager
40 lens
50 controller

The invention claimed is:

1. A distance measuring device that measures a distance to an object, the distance measuring device comprising:
    a light source that emits pulsed light;
    a reflector that reflects and radiates, as radiation light, the pulsed light emitted from the light source, and reflects object light that is the radiation light reflected by the object and returning; and
    an imager that captures the object light reflected by the reflector, wherein
    the pulsed light emitted from the light source is diffused light,
    the light source and the imager are located to face the reflector,
    the reflector radiates, as the radiation light, light in a shape with a long axis and a short axis,
    the imager performs exposure in synchronization with the pulsed light to capture the object light,
    the reflector has a cone shape including a base that is elongated and a vertex, and
    the reflector is disposed with the vertex located closer to the light source than the base,
    the reflector has an elliptical cone shape, and
    a lateral surface of the elliptical cone shape is a curve recessed inward.

2. The distance measuring device according to claim 1, wherein
    the reflector has a polyhedral cone shape with an elongated polygonal base.

3. The distance measuring device according to claim 2, wherein
    lateral surfaces of the polyhedral cone shape are curves recessed inward.

4. The distance measuring device according to claim 1, wherein
    the imager is located to substantially face a center of the reflector.

5. The distance measuring device according to claim 1, wherein
    the light source is located to substantially face a central region of the reflector.

6. The distance measuring device according to claim 1, wherein
    a plurality of light sources are arranged, each of which is the light source.

7. The distance measuring device according to claim 1, wherein the light source includes:
    a light-emitting element that emits the pulsed light; and
    an actuator that dynamically displaces the light-emitting element to rotate the pulsed light emitted from the light source about a center of the reflector as a center of rotation.

8. The distance measuring device according to claim 7, further comprising:
    a readout circuit that reads out images captured by exposing the imager, wherein
    the readout circuit sequentially reads out partial images captured by exposing, out of a plurality of regions to be read out, only regions on which the object light is incident, in synchronization with rotation of the pulsed light emitted from the light source.

9. The distance measuring device according to claim 1, wherein the light source includes:
    a light-emitting element that emits the pulsed light; and
    a mirror that reflects the pulsed light emitted from the light-emitting element to rotate the pulsed light emitted from the light source about a center of the reflector as a center of rotation.

10. The distance measuring device according to claim 1, wherein
    the pulsed light emitted by the light source is a laser beam with a diffusion angle of 3 degrees or greater.

11. The distance measuring device according to claim 1, wherein
    if the distance measuring device is placed in a moving object, the long axis of the radiation light extends in a moving direction of the moving object.

12. A moving object in which the distance measuring device of claim 1 is placed, wherein
    the distance measuring device is disposed with the long axis extending in a moving direction of the moving object.

13. A distance measuring device that measures a distance to an object, the distance measuring device comprising:
    a light source that emits pulsed light;
    a reflector that reflects and radiates, as radiation light, the pulsed light emitted from the light source, and reflects object light that is the radiation light reflected by the object and returning; and
    an imager that captures the object light reflected by the reflector, wherein
    the pulsed light emitted from the light source is diffused light,
    the light source and the imager are located to face the reflector,
    the reflector radiates, as the radiation light, light in a shape with a long axis and a short axis,
    the imager performs exposure in synchronization with the pulsed light to capture the object light,
    the reflector has a cone shape including a base that is elongated and a vertex,
    the reflector is disposed with the vertex located closer to the light source than the base,
    the reflector has a polyhedral cone shape with an elongated polygonal base, and
    lateral surfaces of the polyhedral cone shape are curves recessed inward.

* * * * *